US 8,294,721 B2

(12) United States Patent
Takemura

(10) Patent No.: US 8,294,721 B2
(45) Date of Patent: Oct. 23, 2012

(54) PROCESSOR FOR THREE DIMENSIONAL COMPUTER GRAPHICS

(75) Inventor: Yukitaka Takemura, Tokyo (JP)

(73) Assignee: Digital Media Professionals Inc., Tokyo (JP)

( * ) Notice: Subject to any disclaimer, the term of this patent is extended or adjusted under 35 U.S.C. 154(b) by 0 days.

(21) Appl. No.: 13/273,787

(22) Filed: Oct. 14, 2011

(65) Prior Publication Data

US 2012/0069013 A1    Mar. 22, 2012

Related U.S. Application Data

(63) Continuation of application No. PCT/JP2010/002765, filed on Apr. 16, 2010.

(30) Foreign Application Priority Data

Apr. 17, 2009  (JP) ................. 2009-100418

(51) Int. Cl.
  *G06F 15/80*  (2006.01)
  *G06F 15/16*  (2006.01)

(52) U.S. Cl. ...................... 345/505; 345/502

(58) Field of Classification Search .......... 345/501, 345/502, 505
See application file for complete search history.

(56) References Cited

U.S. PATENT DOCUMENTS

| 6,806,872 B2 * | 10/2004 | Mino et al. ............... 345/211 |
| 7,218,291 B2 | 5/2007 | Abdalla et al. |
| 7,659,898 B2 * | 2/2010 | Prokopenko et al. ......... 345/505 |
| 2007/0273691 A1 | 11/2007 | Collomb |

FOREIGN PATENT DOCUMENTS

| GB | 2408661 | 2/2008 |
| JP | 2000-039996 | 2/2000 |
| JP | 2007-122209 | 5/2007 |
| JP | 2007-512603 | 5/2007 |
| JP | 2008-512771 | 4/2008 |

OTHER PUBLICATIONS

International Preliminary Report on Patentability, with English Translation, issued Oct. 18, 2011, for corresponding International Application No. PCT/JP2010/002765.
International Search Report issued by the Japanese Patent Office (ISA) for corresponding International Application No. PCT/JP2010/002765, with mailing date of May 25, 2010.

* cited by examiner

*Primary Examiner* — Jacinta M Crawford
(74) *Attorney, Agent, or Firm* — Myers Wolin, LLC

(57) ABSTRACT

The object of the present invention is to provide a processor that is specifically suitable for three dimensional computer graphics that can handle pluralities of programs by only one processor. The control unit 11 of the processor of the present invention has n units of process controllers 21. The execute unit 13a-13h in the processor has register areas that correspond to the n units of process controllers 21. The present invention can therefore provide a processor that is specifically suitable for three dimensional computer graphics that can handle pluralities of programs by only one processor.

3 Claims, 3 Drawing Sheets

PROCESSOR FOR THREE DIMENSIONAL COMPUTER GRAPHICS

CROSS REFERENCE TO RELATED APPLICATIONS

The present application is a continuation of International Application No. PCT/JP2010/002765 filed on Apr. 16, 2010, which claims priority to Japanese Patent Application No. 2009-100418 filed on Apr. 17, 2009, the contents of each of which are incorporated herein by reference.

TECHNICAL FIELD

The present invention relates to a processor for three dimensional computer graphics. More specifically, the present invention relates to a processor for three dimensional computer graphics that can handle pluralities of programs simultaneously by means of the single processor.

BACKGROUND OF THE ART

Japanese Patent Publication number 2008-512771 discloses a subsystem for dealing with graphics. The system has a programmable processor. The system can change scale of the processor according to required performance; it can scale up and down the processor. However, the system requires huge controlling mechanism and requires a lot of time for managing processors.

DISCLOSURE OF THE INVENTION

One object of the present invention is to provide a processor which is suited for three dimensional computer graphics that can handle pluralities of programs simultaneously by means of the single processor.

A processor for three dimensional computer graphics 1 of the present invention has a control unit 11, pluralities of execute units 13a-13h, and lines (basses) 15. The control unit 11 has a decoder 17, a program interface 19, and n units of process controllers 21. The number 2 means an integer that is 2 or larger than 2. The decoder 17 can decode one or pluralities of orders simultaneously. The decoder 17 can output the decoded orders to program interface 19. The program interface 19 can output the orders decoded by the decoder 17 to any one of n units of process controllers 21 at every clocks. Each of the process controllers 21 outputs control signals to pluralities of execute units 13a-13h in accordance with the orders decided by the decoder 17.

Each of the pluralities of execute units 13a-13h has a processing part 23, a register 25 and a data pass control part 27 for executing more than 2 orders simultaneously. The processing part 23 has pluralities of processing circuits 31, 33, 35, 37, 39. The pluralities of processing circuits have a multiplexer 31 and an adder 33, at least. The register 25 has pluralities of register area that is divided based on pluralities of register address. Each of the pluralities of register area is a register area that corresponds to any one of the n units of process controllers 21. The line 15 connects the control unit 11 and pluralities of execute units 13a-13h. The control signal has information on the register address for appointing a register area in which processing is executed. The control signal further has information on processing which the processing part 23 executes. The execute units 13a-13h decide a register area in accordance with the register address which is included in the control signal. The execute units 13a-13h decide a processing circuit 31, 33, 35, 37, 39 in the processing part 23 for every clock based on the information on processing which is included in the control signal. The data pass control part 27 decides a processing circuit which is used at a clock based on information regarding processing circuit which is used at the clock thereby the part can prevent 2 or more processing circuits are used to deal with more than 2 orders at the clock.

The control unit 11 of the processor of the prevent invention has n units of process controllers 21. The execute units 13a-13h have register areas that correspond to then units of process controllers 21.

Thus the present invention can provide a processor for three dimensional computer graphics that can execute or deal with pluralities of programs simultaneously by using one single processor.

DETAILED DESCRIPTION

Figure 1:
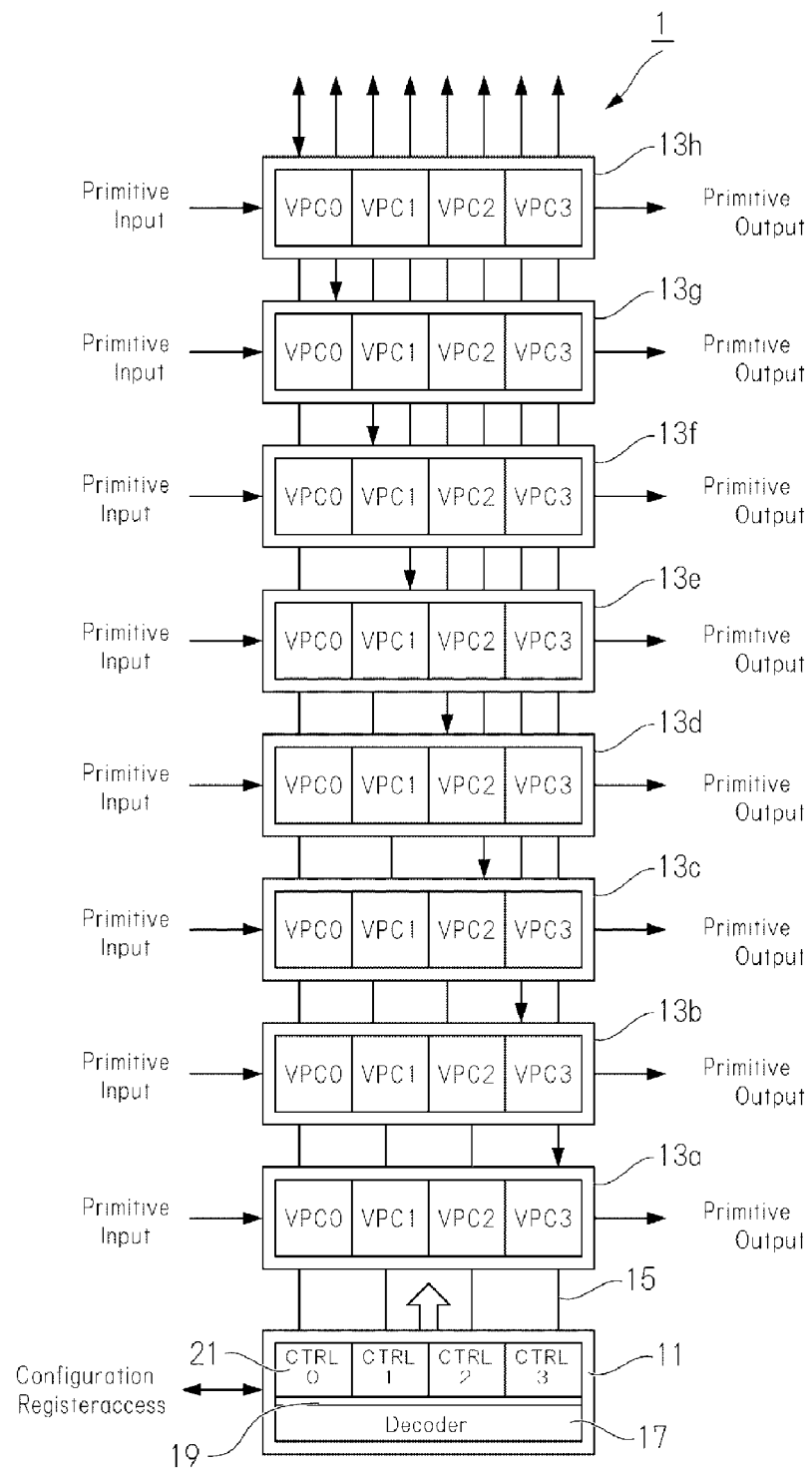
FIG. 1 depicts a block diagram of a processor for three dimensional computer graphics of the present invention.
Figure 2:
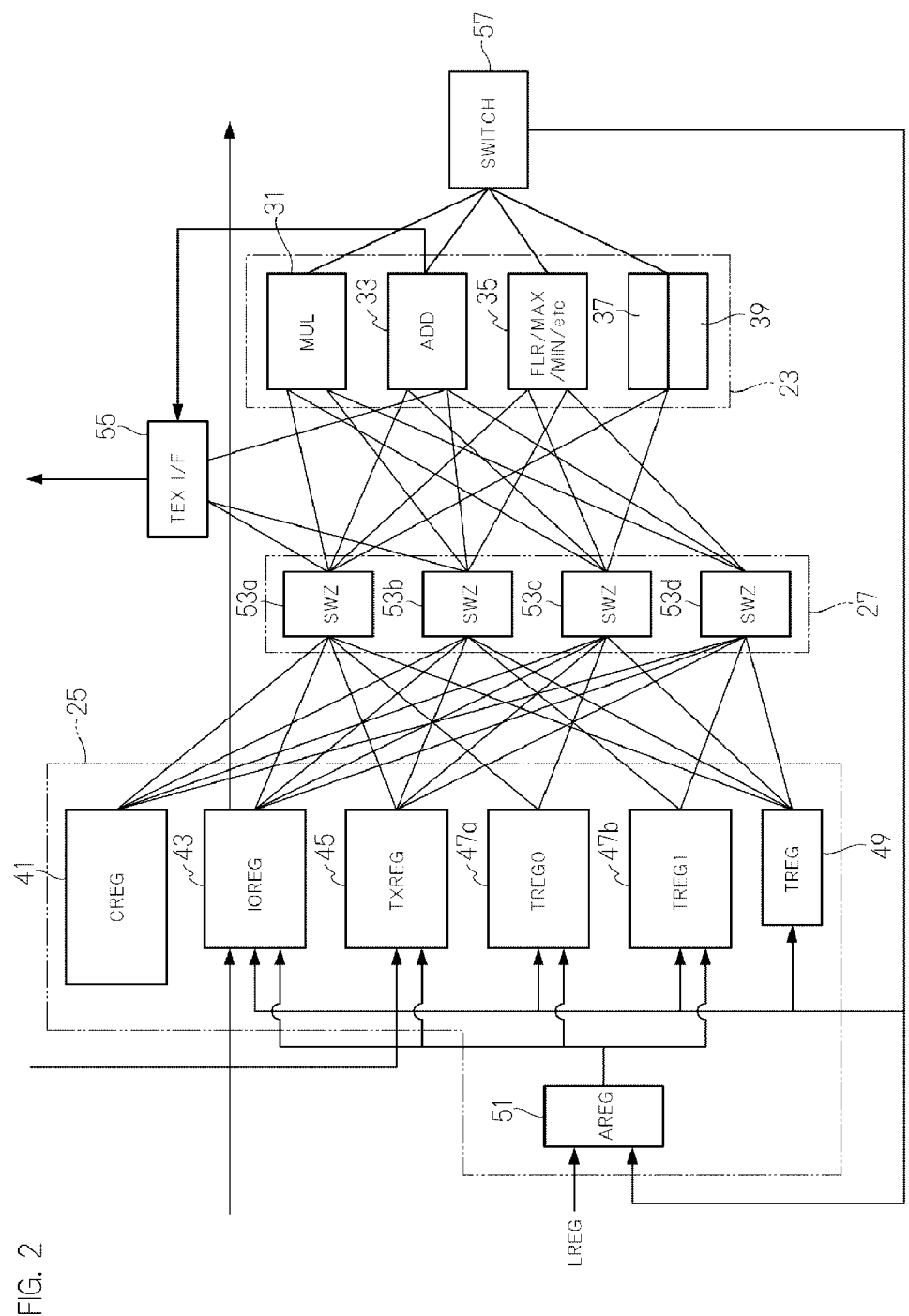
FIG. 2 depicts an example of a block diagram of an execute unit of the present invention.
Figure 3:
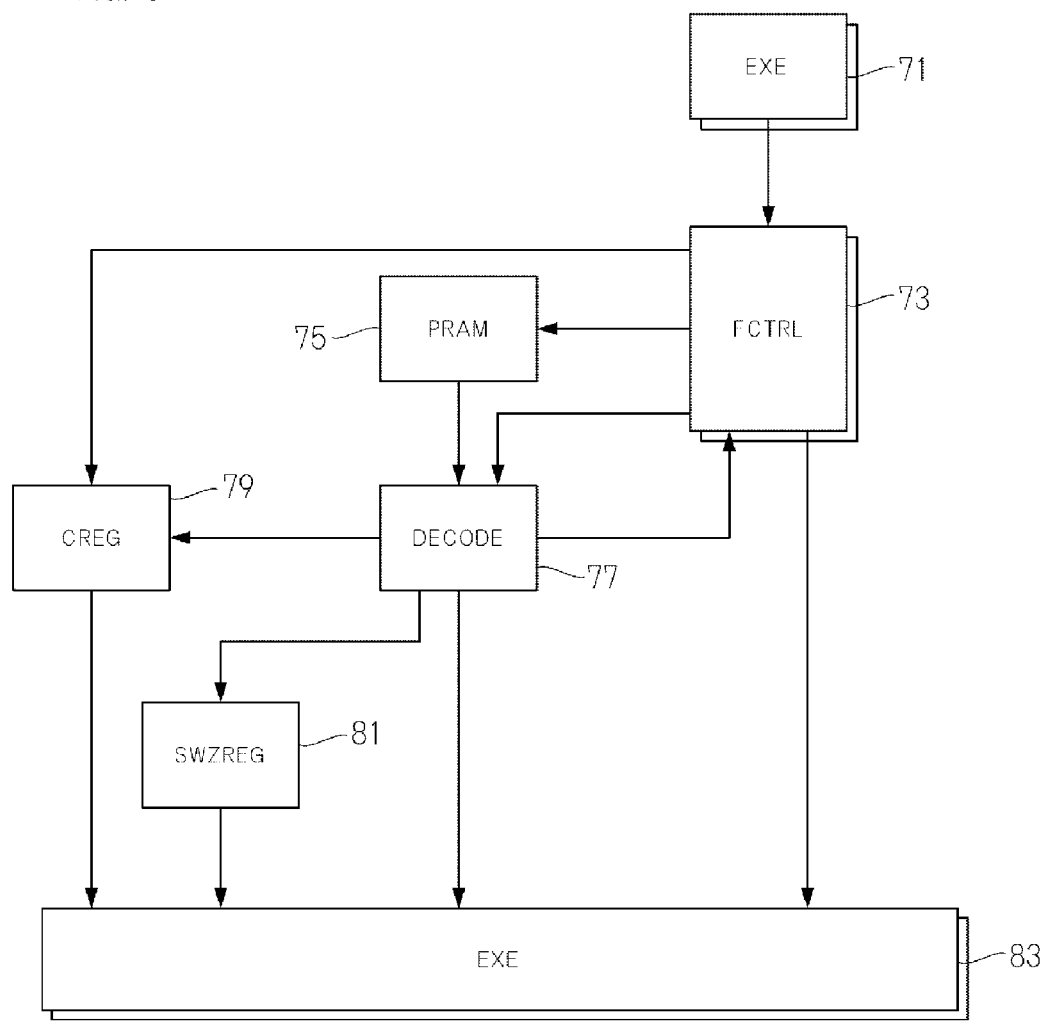
FIG. 3 depicts an example of a block diagram of a control unit of the present invention.

Examples of the present invention are explained using figures. However the scope of the present is not limited to the following examples but includes modifications that are obvious for a person skilled in the art. FIG. 1 depicts a block diagram of a processor for three dimensional computer graphics of the present invention. FIG. 2 depicts an example of a block diagram of an execute unit of the present invention. FIG. 3 depicts an example of a block diagram of a control unit of the present invention.

As shown in FIG. 1, a processor for three dimensional computer graphics 1 has control unit 11, pluralities of execute units 13a-13h and line 15. The processor for three dimensional computer graphics 1 is a processor for displaying three dimensional graphics onto a computer. The processor can handle various kinds of processing regarding three dimensional computer graphics. The processor may be implemented in a computer, a game apparatus, and a mobile terminal.

The control unit 11 has decoder 17, program interface 19, and n units of process controllers 21. The number n is an integer that is 2 or larger than 2. It is preferred that the n is from 2 to 8. The n in the FIG. 1 is 4. The decoder 17 may be connected various circuits and elements through basses that are not explicitly depicted in figures. The decoder 17 can decode one or pluralities of orders simultaneously. Any of the conventional decoders may be used as the decoder of the present invention. The decoder 17 can output the decoded orders to program interface 19. The program interface 19 can output the orders decoded by the decoder 17 to any one of n units of process controllers 21 at every clocks. Each of the process controllers 21 outputs control signals to pluralities of execute units 13a-13h in accordance with the orders decided by the decoder 17.

As shown in FIG. 2, each of the pluralities of execute units 13a-13h has a processing part 23, a register 25 and a data pass control part 27 for executing more than 2 orders simultaneously.

The processing part 23 has pluralities of processing circuits 31, 33, 35, 37, 39. The pluralities of processing circuits have a multiplexer 31 and an adder 33, at least. The processing circuit of FIG. 2 further has a multi-processor 35, a four input adder 37 and an inverse calculator 39. The multi-processor 35 is a processor that can handle various kinds of processing. The multi-processor 35 depicted in FIG. 2 has a floor processor, a max processor, and a min processor. The max processor is a processor that can output the maximum value within input values. The min processor is a processor that can output the minimum value within input values. The inverse calculator is a processor that can output 1/x when the value x is input into the calculator.

The register 25 has pluralities of register area that is divided based on pluralities of register address. Each of the pluralities of register area is a register area that corresponds to any one of the n units of process controllers 21. The register area is divided so as to correspond to each of the in accordance with each of process controllers theoretically or virtually.

The execute unit 13 of FIG. 2 has a predetermined value register 41, an input and output register 43, a texture register 45, a temporally register 47a, 47b, an intermediate register 49 and an address register 51. They are divided into four areas that virtually correspond to the value of n.

The predetermined value register 41 is a unit that stores predetermined values that are used in various kinds of processing. The input and output register 43 is a unit that temporally stores input information and information output from the execute unit. The present invention can clearly control the clocks of the input and output register. Thus the present invention can utilize the input and output register as a working space or storing area for the data waiting for being output when the input and output register is not used or no information is stored on the input and output register. Thus it is preferred that the memory of the input and output register is set to be larger than that of the conventional input and output register. For example, the memory of the input and output register may be configured to be larger than the memory of texture register 45. More specifically, the memory of the input and output register in the processor of the present invention has from 1.5 to 4 times than that of texture register 45.

A temporary register 47a, 47b and an intermediate register 49 are units that temporally store various information that is used in processing. The temporary register is typically used when the data keeping duration is only one clock. The intermediate register is used for storing such information that is used only one clock and never be used. The intermediate register 49 works in a flip and flop manner. For example, it is usually for the group of registers to have four output ports to activate 2 inputs and one output processor when 2 orders are issued and these orders are processed simultaneously. The input and output register and the predetermined values register are not used frequently. Thus it usually thought that it is better for the temporary register to have four output ports. A temporary register is usually high cost and thus it is not easy for increasing the number of ports of a temporary register. Thus a preferred embodiment of the present invention has an intermediate register so as to increase the number of output ports. An intermediate register 49 corresponds to a temporary register that has 0 address. Namely, an intermediate register 49 is a register the address area of which is not divided into n parts.

A data pass control part 27 has Swizzle units 53a-53d. Namely, it suitably treats information output from each of registers 25 and leads the information to a suitable processing circuit (31, 33, 35, 37, 39). Swizzle unit is a unit that executes various types of processing before the system executes the other processing. Swizzle unit executes, for example, a processing that change a position of input vector and a processing that change plus and minus.

Information from a loop register (LREG), which is not depicted in figures, is input into an address register 51. The information input into the address register 51 is transmitted to a designated work area in the register 25. Various kinds of information are input into the input and output register 43 and stored in a designated area in the input and output register 43. Texture information from the texture interface is input into a texture register 45 and is stored in the designated area in the texture register 45.

The information temporally stored by each registers is suitably forwarded to suitable Swizzle units 53a-53d by means of the data pass control part 27. The information output to a Swizzle units 53a-53d are executed necessary Swizzle processing by the Swizzle units 53a-53d.

The data that has executed necessary Swizzle processing by Swizzle units 53a-53d is output to a suitable processing circuit 31, 33, 35, 37, 39 or a suitable texture interface 55. The data suitably processed by the processing circuit 31, 33, 35, 37, 39 is forwarded to a suitable register by means of a switch unit 57. After the processing is finished, the information is forwarded to the input and output register 43 and then it is output.

The data that has the prescribed information added by the adder 33 is output through the texture interface.

The execute units in FIG. 2 are an example and thus it is possible to modify the execute units. The example of the modified execute unit is a scalar processing unit instead of the four input adder 37 and the inverse calculator 39.

Next, we explain the control unit based on the FIG. 3. As shown in the FIG. 3, the control unit has a fragment controller 73, a program RAM (random access memory) 75, decoder 77, a predetermined values register 79, and a Swizzle register 81.

The execute units 71, 83 in FIG. 3 correspond to the execute units 13a-13h in FIG. 1.

The fragment controller 73 acts a process controller. Namely in the example one process controller may act as n units of virtual fragment controllers 73. Furthermore, n units of fragment controllers may act as n units of process controllers. These fragment controllers transmit control information based on decoded information decoded by the decoder 77 to the execute unit 83 through an interface which is not depicted in figures.

The program RAM 75 controls decoders so that the decoders output the decoded orders to any of the n units of the fragment controllers 73 for every clock. Then the program interface outputs the decoded order to any of the n units of process controllers for every clock.

A decoder 77 is a unit that decodes input information.

A predetermined values register 79 is a unit that stores predetermined values that are used in processing. The unit output the prescribed predetermined values to an execute unit 83 based on the control order decoded by the decoder.

Swizzle register 81 is a unit that stores the passes for processing for Swizzle 53a-53d, and the passes for Swizzle 53a-53d and the processing part 23. Swizzle register 81 outputs information regarding processing executed at the execute unit 83 based on the control orders decoded by the decoder.

For example, the information output from the execute unit 71 inputs into the fragment controller 73. A part of the information input into the fragment controller 73 is output to the next execute unit 83. The remaining information input into the fragment controller 73 is output to the program RAM 75 or a decoder 77. The program RAM 75 output an order that controls the detector to output decoded order to output to any of the n units of fragment controllers 73 to the decoder for every clock.

The order decoded by the decoder is output to any of the n units of process controllers through a program interface for every clock.

A predetermined values register 79 output s prescribed predetermined values to a execute unit 83 based on a control order decoded by a decoder. Swizzle register 81 outputs information on processing executed at the execute unit 83 based on the control orders decoded by the decoder.

The lines 15 connect a control unit 11 and the pluralities of execute units 13a-13h. The control signal has information on the register address that designates register area that deals with processing and information on the processing executed at the processing part 23. The execute units 13a-13h decide the register area based on the register address that is included in the control signal. The execute units 13a-13h decide the processing circuits 31, 33, 35, 37, 39 which are used at one clock based on information regarding processing that are included in the control signal. The data pass control part 27 decides the processing circuit which is used at one clock based on information regarding processing circuit which is used at the clock and thereby the part prevent the situation that 2 or more of processing circuits are used when the system deals with 2 or more orders simultaneously.

The present invention relates to a processor for three dimensional computer graphics. Thus the present invention may be used in, e.g., a computer industry, a game apparatus industry and a semi-conductor industry for mobile systems.

Explanation of Element Numerals

1 a processor for three dimensional computer graphics

11 control unit

13a-13h execute unit

15 line

17 decoder

19 program interface

21 process controller

23 processing part

25 register

27 data pass control part

31 multiplexer

33 adder

35 multi-processor

37 four input adder

39 inverse calculator

43 input and output register

45 texture register

What is claimed:

1. A processor for three dimensional computer graphics that comprises:

a control unit, pluralities of execute units and lines, wherein the control unit comprises a decoder, a program interface, and n units of process controllers, the n being an integer that is greater than or equal to 2, wherein the decoder decodes one or pluralities of orders simultaneously and outputs orders that the decoder decodes to the program interface wherein the program interface outputs the orders that the decoder decodes to the n units of process controllers, wherein each of the process controllers outputs a control signal that corresponds to any one of the pluralities of execute units based on the orders that the decoder decodes, wherein each of the pluralities of execute units comprises a processing part, a register, and a data pass control part for executing 2 or more orders simultaneously, wherein the processing part comprises pluralities of processing circuits, each of the pluralities of processing circuits comprises a multiplexer and an adder, wherein the register comprises pluralities of register areas divided based on pluralities of register addresses, wherein each of the pluralities of register areas corresponds to any one of the n units of process controllers, wherein the lines connect the control unit and the pluralities of execute units, wherein the control signal comprises information on a register address for designating a register area at which a transaction is executed, and information on processing which is executed at the processing part, wherein the execute units decide the register area based on the register address which is included in the control signal, and decides the processing circuits, in the processing part that are used at one clock based on the information on processing included in the control signal, and wherein the data pass control part determines a processing circuit which is used at the one clock by using information regarding the processing circuit which is used at the one clock thereby preventing two or more processing circuits to process more than two orders at the one clock.

2. A processor for three dimensional computer graphics in accordance with claim 1, wherein the register comprises an input and output register and a texture register, and capacity of the input and output register is larger than capacity of the texture register.

3. A processor for three dimensional computer graphics in accordance with claim 1, wherein the register comprises a temporary register and an intermediate register, wherein the temporary register is a unit that temporally stores various information that is used for processing, wherein the intermediate register is a unit that is divided into register areas that correspond to the n units of process controllers.

* * * * *